United States Patent

[11] 3,551,598

[72] Inventors Giorgio de Varda; Saverio Martinelli, Milan, Italy
[21] Appl. No. 676,135
[22] Filed Oct. 18, 1967
[45] Patented Dec. 29, 1970
[73] Assignee Societa Italiana Telecomunicazioni Siemens S. p. A. Milan, Italy a corporation of Italy
[32] Priority Oct. 20, 1966
[33] Italy
[31] No. 29035-A/66

[54] SIGNAL-EVALUATING LOGIC WITH CIRCULATING MEMORY FOR TIME-SHARING TELECOMMUNICATION SYSTEM

11 Claims, 9 Drawing Figs.

[52] U.S. Cl. .......... 179/7.1, 179/7
[51] Int. Cl. .......... H04m 15/00
[50] Field of Search .......... 179/7, 7.1, 15AT, 15AST, 15Sig, 18.9; 340/172.5; 178/50

[56] References Cited

UNITED STATES PATENTS

| | | | |
|---|---|---|---|
| 3,171,895 | 3/1965 | Guenther .......... | 179/18 |
| 3,302,184 | 1/1967 | Lavenir .......... | 340/172.5 |

*Primary Examiner*—Kathleen H. Claffy
*Assistant Examiner*—Jan S. Black
*Attorney*—Karl F. Ross ABSTRACT: A circulating memory with four delay lines $L_1$–$L_4$ in the output of a pulse counter CPB stores bits relating to line seizure, dialing and other signals appearing on a set of lines of a time-sharing telecommunication system which are sampled during respective time slots $c_1$, $c_2$ etc. of 10 μs during a 100-μs scanning period $T_A$ recurring at intervals $T_C$ of 6 ms, the bits having a pulse width of 1 μs and being recirculated every 100 μs. Each time slot is subdivided into 10 phases $\varphi_1$, $\varphi_2$ etc. of 1 μs each, the first phase $\varphi_1$ of each time slot determining the permanence of a voltage change on a corresponding test wire A and entering a bit in an auxiliary delay line $L_5$ for recirculation on detection of a state of energization of the test wire lasting for at least four recurrence intervals $T_C$, as determined by counter CPB and registered in binary code form on its first two delay lines $L_1$, $L_2$, to eliminate the effect of spurious transients. A shift register $R_{fs}$, responding to the bits recirculated by line $L_5$ and the output of a binary decimal matrix (FIG. 5) connected across the main delay lines $L_1$—$L_4$, stores for 1 μs an effective transition from battery potential to ground or vice versa during the first phase $\varphi_1$ and, upon the grounding of test wire A, enables the counter in the second phase $\varphi_2$ to start a chronometric sequence advancing by one count every 12 ms. In the remaining phases $\varphi_3$–$\varphi_{10}$ the shift register $R_{fs}$ and the delay line $L_5$ control the recognition of dialing pulses and switching signals occurring during certain stages of operation as established by the chronometric count in phase $\varphi_2$. The ten phases of the last time slot $c_{10}$ are used to step a clock circuit which counts time continuously in ten denominational orders from $10^{-4}$ second to 10 hours, the register $R_{fs}$ serving to shift from one denominational order to the next.

PATENTED DEC 29 1970 3,551,598

Giorgio DE VARDA
Saverio MARTINELLI

INVENTORS

BY

Karl F. Ross

Attorney

Giorgio DE VARDA
Saverio MARTINELLI
INVENTORS

BY Karl F. Ross
Attorney

Giorgio DE VARDA
Saverio MARTINELLI
*INVENTORS*

BY

Karl F. Ross

*Attorney*

Giorgio DE VARDA
Saverio MARTINELLI
*INVENTOR.S*

BY Karl F. Ross
*Attorney*

Giorgio DE VARDA
Saverio MARTINELLI
INVENTORS

BY Karl F. Ross
Attorney

Giorgio DE VARDA
Saverio MARTINELLI

INVENTORS

BY

Karl F. Ross

Attorney

Giorgio DE VARDA
Saverio MARTINELLI
INVENTORS

BY

Karl F. Ross
Attorney

SIGNAL-EVALUATING LOGIC WITH CIRCULATING MEMORY FOR TIME-SHARING TELECOMMUNICATION SYSTEM

The present invention relates to a network of circuits for an electronic system of cyclic reception, elaboration and registration of telephonic switching signals pertaining to the lines of several users originating at a central office. By means of such network the signals appearing on the various telephone lines (concerning, for example, the number selected, the state of the call, the length of the conversation, the data for the applicable tariff and the sum to be debited) are received in sequence, by means of a time-sharing system, elaborated, stored in a circulating memory and transmitted to the output device (card puncher, tape, register, transmission channel), thus permitting the documentation and the measure of the telephone traffic with respect to various lines. In practice it is desirable that the apparatus installed at the central office be not limited solely to the control of the operation of interconnection between users but should further automatically derive the data for the debiting of the costs of the communication to the individual users (through the counting of calls and the selection of the tariffs) and furthermore execute measurements on intense traffic, furnishing thereby useful data for a study of better utilization of the telephone lines and the central office equipment. Installations that carry out these functions are well known to telephone technology. The systems which are most widely utilized are of the electromechanical type and use as components relays, selectors, impulse counters etc.

Among the principal drawbacks of such apparatus the most apparent are: the space and bulk due, apart from the relevant dimensions of the electromechanical components, also to the fact that it is generally not possible to install a single piece of equipment for serving several channels but rather it is necessary to provide a separate unit to serve each channel; the relatively slow operating speed; and the need for continuous maintenance inherent in electromechanical components.

Because of the above-cited inconveniences the utilization of such equipment remains somewhat limited (as for example in intercity dialing installations).

The application of the principle of dealing with several lines successively by the time-sharing multiplex method affords the advantage of greatly reducing the number of circuits necessary for the realization of the equipment mentioned above. This is because the information arriving from several lines may be processed by the same circuit.

Such a system, however, becomes economical only when the scanning of the lines is executed in rather short time periods (at the most of the order of a millisecond); this implies that during each cycle each line engages the central office for an even shorter time period (of the order of some microseconds).

Electronic switches with time sharing currently in use (see for example in SIEMENS ZEITSCHRIFT No. 37, 1963, part 2, from page 2 to page 61 and "IEE Transactions on Communications and Electronics" of November 1964 from page 612 to page 620) introduce problems in the adaptation to the electromechanical equipment already in use. These problems consist in the translation of the switching signals furnished by the electromechanical equipment into the code used by the electronic equipment.

The solutions hitherto available for this problem are not particularly reliable and have a very limited effect.

The present invention proposes a solution to the problems of telephone traffic measurement which proves to be particularly reliable and economical.

The invention comprises a space-time multiplexer which connects the lines to be examined one by one to the receiving, elaborating and registration circuitry. This device consists of a command logic network followed by a multichannel bidirectional counter formed by four delay lines and by a counter designed as a logic network. This counter is followed by an output register which stores the result of the operations each time such a result is transmitted to the register; this unit may be, for example, a tape puncher. The command logic network also receives information fed back from the output of the multichannel bidirectional counter as well as the information appearing on the various input lines. This enables a control to be kept on the situation revealed at the output of the counter.

The features of the invention will be more clearly apparent from the following description given with reference to the accompanying drawing in which.

Figure 1:
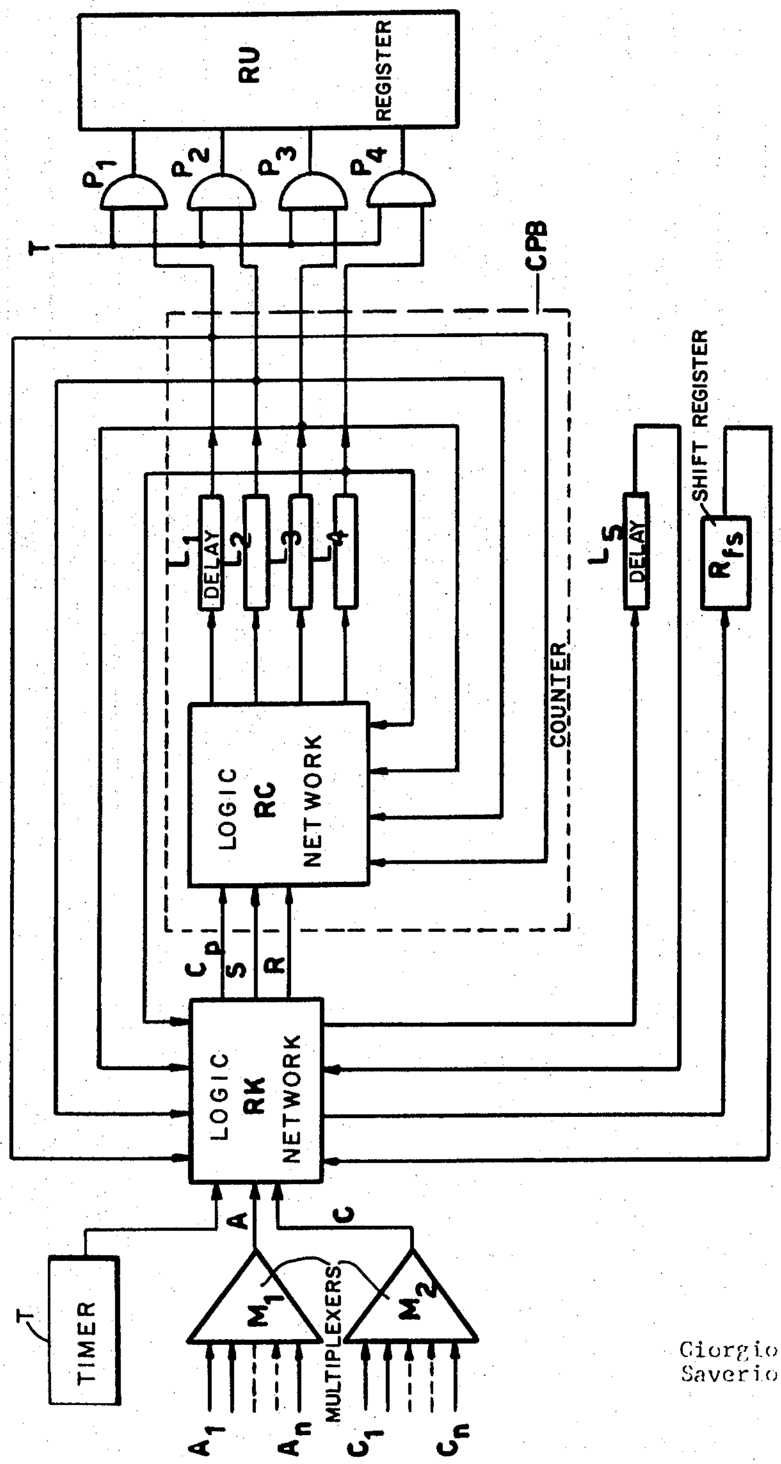
FIG. 1 shows a block diagram of a system according to our invention.

In the circuit arrangement according to FIG. 1 the wires $A_1$, $A_n$ and $C_1$, $C_n$ of $n$ lines are connected through respective space-time multiplexers $M_1$ and $M_2$ to a logic network RK which in turn sends the information through connections $C_p$, S and R to a multichannel bidirectional counter CPB. This counter, consisting of a logic network RC and of four delay lines $L_1$, $L_2$, $L_3$, $L_4$, apart from carrying out the task of totaling the bits originating at RK, uses its delay lines as dynamic circulating memories in such a way that the sums of the bits for each channel continue to present themselves periodically at the input of the delay lines as long as a new count does not modify the number and the disposition of these bits.

A system of gates $P_1$, $P_2$, $P_3$, $P_4$ permits the transfer of the signals presented at the output of the counter CPB to an output register RU, once an impulse T is superimposed.

Figure 2:
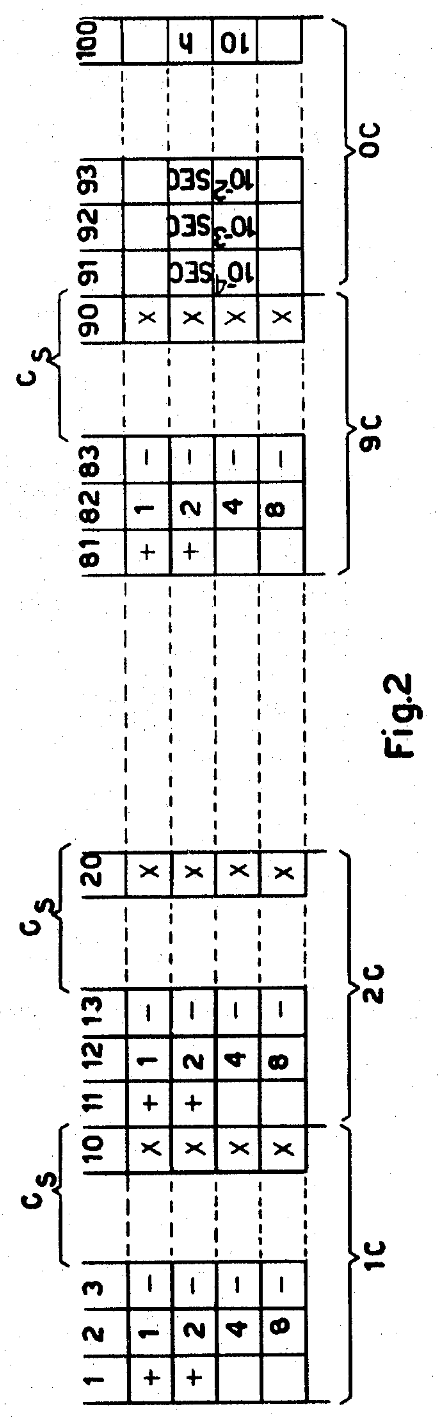
FIG. 2 shows the distribution of the signals along the delay lines of the multichannel counter of the system of FIG. 1.

A supplementary delay line $L_5$ and a shift register $R_{fs}$, the latter serving the next-following phase as more fully described hereinafter, are connected to the logic network RK. To understand the way in which this circuitry works, it is necessary to first bear in mind the fact that the four delay lines of the network CPB each contain a number $p$ of bits, which appear in sequence in its output at equal time intervals as part of successive phases. The four bits of each phase which are concurrently present at the outputs of the delay lines correspond to a decimal number K ranging between 1 and 16. This number K is presented cyclically at the output with a recurrence period equal to the time during which the bits circulate through the assigned delay lines unless signals arise at the inputs $C_p$, S and R of the network itself. In case a signal $C_p$ is present, there is written into the memory in the same phase the number K+1 in place of the number K. This operation is conditional on there being a simultaneous counting sense signal S (S=1). Alternatively the number K−1 is written if the counting sense signal is absent (S=0). The signal R, called the reset signal, cancels all the four bits in the phase. In the embodiment of the invention described, the delay lines hold 100 bits separated by one $\mu$sec. from one another in such a way that the four bits of any phase arrive at the output every 100 $\mu$sec. As shown in FIG. 2, the 100 bits that circulate in the delay lines are divided into 10 groups of 10 bits each. The first nine groups 1C, 2C, 9C are time slots assigned to respective input lines to be tested whereas the last group OC, comprising the bits of phases No. 91 to No. 100, serves as a high precision clock circuit which has the task of determining the length of conversation.

The space-time multiplexers $M_1$ and $M_2$ respectively transmit to the output wires A and C the state of energization (battery voltage or ground) of wires $A_i$ and $C_i$ of the lines. That is to say that during the period of 10 μsec. assigned to the group constituting the first ten phases (from No. 1 to No. 10) the first line is connected, in the following period assigned to the group constituting the next ten phases (from No. 11 to No. 20) the second line is connected, and so on until the ninth and last line.

To this end the multiplex is commanded by various scanning signals all generated by a single timer T. These pulses, shown in FIG. 6, consist of a principal sampling signal $M_A$ which lasts a time $T_A$ and has a cadence $T_C$, of 10 pulses $c_1, c_2 \ldots c_10$ of a duration equal to one-tenth of $T_A$ and recurring with a period $T_A$, and of 100 signals $\varphi_1, \varphi_2 \ldots \varphi_{100}$ which last a tenth of the duration of the signals $c_1$ and also recur with a period equal to $T_A$.

In a practical example $T_C$ lasts 6 msec., $T_A$ lasts 100 μsec., $c_i$ lasts 10 μsec. and occurs every 100 μsec., and $\varphi_1$ lasts 1 μsec. and occurs every 100 μsec.

In the first phases of each group (Nos. 1, 11, 21,...., 81) (FIG. 2) the system analyzes incoming signals in such a way as to reject the noise pulses superimposed on the signals pertaining to telephonic criteria, thereby performing a task analogous to that undertaken by an antidisturbance filter. Since this filtering takes place in a logical way, it is convenient to call the bits in the first phase of each group a "digital filter." In the second phases (Nos. 2, 12, 22....82) a signal is measured (chronometer signal) which serves to indicate the duration of the signals examined in the first phase. This signal is obtained from the counter CPB which starts each time that the wire A is found grounded and is used to furnish the necessary time, within the tolerance limits allowed, for evaluation of the selection impulses and the other telephonic criteria. In the third phases (Nos. 3, 13, 23, ....83) the data relating to the state of the communication are registered.

In the other seven phases assigned to each line, which form the group $C_S$, the digits of the selected number are counted and are held in the memory until they are transferred into the output register RU.

Figure 3:
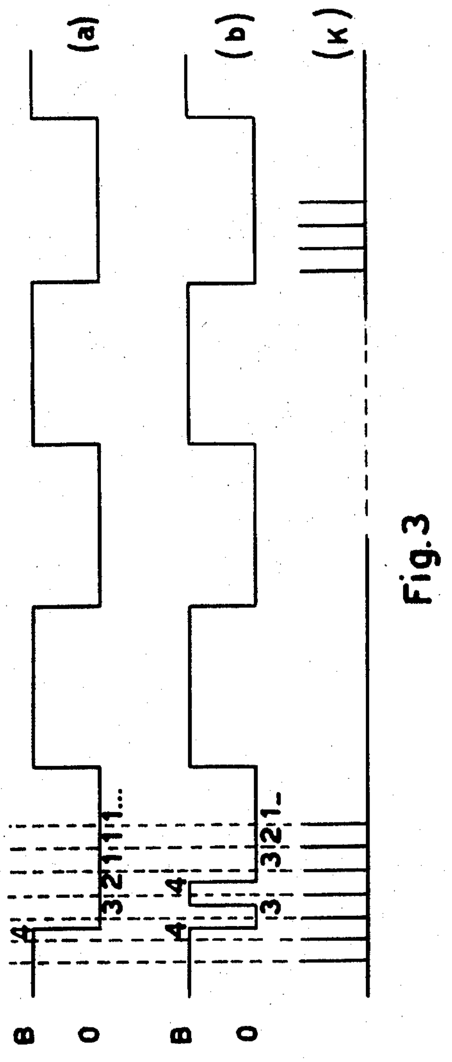
FIG. 3 shows the sampling of a regular signal *a* and a disturbed signal *b* as revealed by a sampling signal K.
Figure 4:
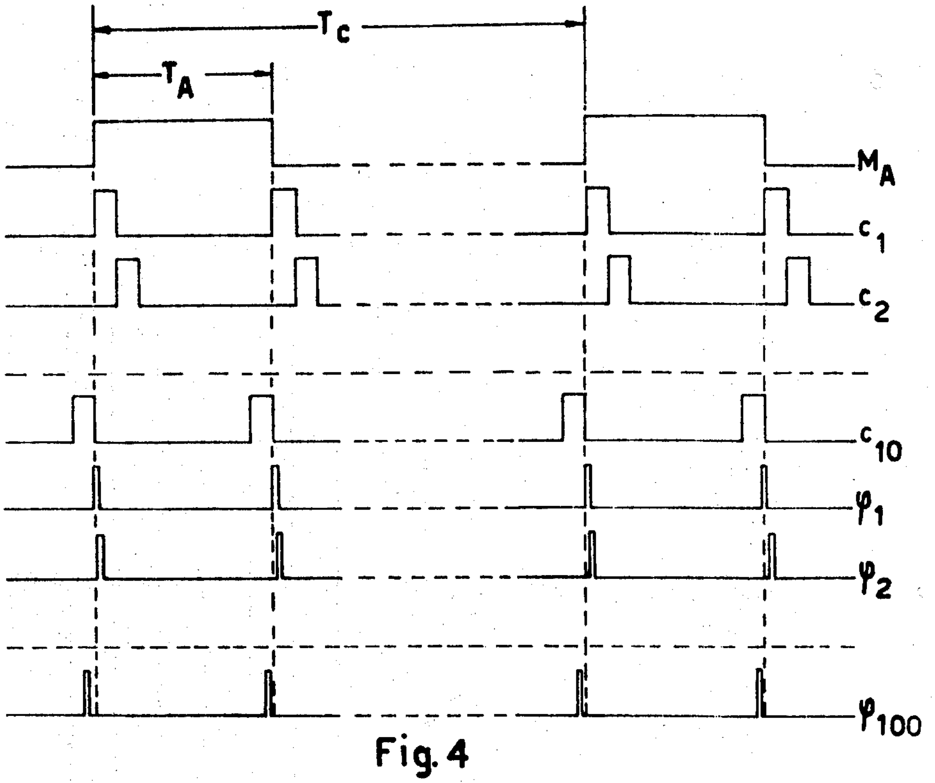
FIG. 4 represents the various scanning signals generated by a single timer.
Figure 5:
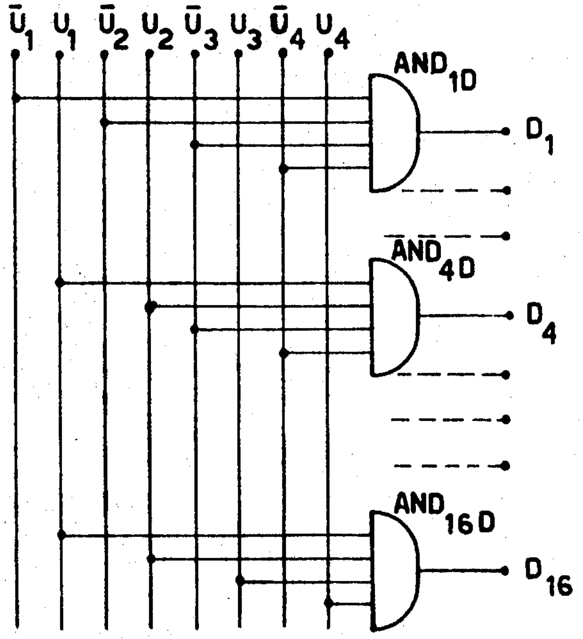
FIG. 5 shows a realization of the decoding circuit which connects the outputs of the multichannel counter to the command logic network of the system.

The technique of sampling is used in the reception of the signals regarding the digits selected and the telephonic criteria, as shown in FIG. 3, thus revealing by means of a sampling signal the state of the voltage on the wires $A_i$ and $C_i$ of the lines at regular time intervals, for example every 6 msec. Thus every 6 msec. all the lines are explored using up 100 μsec. to complete the investigation. The sampling signal arises from the coincidence of the scanning signal $M_A$ with the scanning signals of the first phase ($\varphi_1, \varphi_{11} \ldots \varphi_{81}$).

For various reasons, among which are the inductance of the relays, contact arcing, and discharge of capacitors, spurious voltage spikes are produced which, if they coincide with the sampling pulses, could produce errors in the recognition of the selection impulses and the telephonic criteria. The rejection of such errors arises through the criteria provided by the first phase of each group referred to as digital filter which render the apparatus sensitive to the time integral of such impulses rather than to the instantaneous values of the impulses in a way similar to that which takes place in electromechanical apparatus.

The way in which the digital filter functions is the following:

With each sample of the signals A the logic network RK decides whether to command a count forward or backward according to whether the voltage level is that of the battery or of ground. This counting is stopped when in the forward-counting direction the number $2^m$ is reached (where $m$ indicates the number of delay lines of the network CPB engaged in the phases of the digital filter), or when in the backward direction the number 1 is reached. If no changes occur in the voltages on the lines, the delay lines of the counter CPB in the first phases rest in one of two stable states (1 or $2^m$). In order to securely distinguish a disturbance from a signal or an effective transition it is sufficient that, so as to make the first phases pass from one stable state to another, an exact sampled number $r$ is revealed which is larger by $2^m-1$ Than the number $s$ sampled in error. The filter carries out an investigation of a statistical nature and is in a position to distinguish an error from a signal with the same security as systems which are sensitive to the integral of the signal itself. The number of delay lines used fixes the number of samples that must be taken for a given error in order to obtain a sufficient rejection of such an error.

In the example described herein it was decided to use two of the four delay lines of the network CPB (for example the lines $L_1$ and $L_2$). Thus in the first phases these lines remain in the 1 state when the wire A is definitely grounded and in the 4 state when the wire A is definitely connected to battery. If, for example, the A passes from battery voltage B to ground, the states of the lines in the first phase, on successive sampling, become the following: 4-3-2-1-1....as shown in FIG. 3*a*. Now supposing that at the second sampling a disturbance occurs having an amplitude such as to equal or exceed the battery voltage, the states of the first phase considered will become: 4-3-4-3-2-1-1....as shown in FIG. 3*b*. The transition 3–4 is due to the disturbance; however, it is to be noted that once the disturbance ceases, the count-down continues as far as the state 1. Once the state 1 is reached, the ground signal is emitted and account is taken of the transition from battery voltage B to ground O as an effective transition which is valid for the transmission of a telephonic criterion.

The behavior of the digital filter in the case of the transition from ground to battery voltage is analogous, permitting the distinction between disturbance signals or transients and effective transitions. In the case of isolated disturbances which occur far from the transitions, the filtering turns out to be clearly secure since a single sample indicating a change of voltage of the line can never be considered as a transition.

In order to decide whether to consider a change of voltage as a transition, the delay line $L_5$ must intervene functioning as a circulating memory associated with the circuitry RK. More explicitly a bit is inserted in the memory $L_5$ each time that the filter arrives at the stable state 4 (fixed battery voltage) and is canceled each time that this filter reaches the stable state 1 (ground). In effect it is precisely the addition or the subtraction of a bit to or from the line $L_5$ which signals an effective transition of the voltage of the wire A. The chronometer, functioning in the second phase, starts each time that a transition to ground, properly verified, is registered on any wire A and to this end the next-phase register $R_{fs}$ intervenes. In that shift register the inscription of a bit takes place during the 1-μsec. interval assigned to a phase and this bit appears at the output throughout and only during the following phase. The signal obtained from register $R_{fs}$ in the second phase is interpreted as the starting signal of the chronometer which, on detecting suitable voltages within the permitted limits, emits the signals which are successively interpreted as impulses of selection, end of number, end of dialing selection, or commencement of conversation. The impulses of selection, or dialing pulses, are sent to the delay lines in the corresponding seven phases, there to be stored in order, whereas the last two signals mentioned above are sent via the register $R_{fs}$ to the delay lines in the third phases for the purpose of registering the state of the conversation.

When the call numbers are registered in the respective phases, a bit on line $L_5$ corresponds to one number stored in one phase during the count of the impulses. The end-of-number signal cancels this bit and writes it in the register $R_{fs}$. The output signal of this register in the next 1-μsec. interval reinscribes the bit once again on line $L_5$, thus predisposing the lines to receive the next number in the succeeding phase.

In order to help explain what has been described, the structure of the logic network RK will be described with reference to the circuit diagrams of FIGS. 5, 6, 7, 8 and 9. For the sake of simplicity the description of the operation is limited to that which occurs in the 10 phases of the first group or time slot 1C and in those phases in which the device functions as a clock circuit. A decoding network of the binary decimal type, shown in FIG. 5, connects the outputs $U_1$, $U_2$, $U_3$, $U_4$ of delay lines $L_1$, $L_2$, $L_3$, $L_4$ with the logic network RK, together with the inversions $\overline{U}_1$, $\overline{U}_2$, $\overline{U}_3$, $\overline{U}_4$ of these outputs. The binary signals present on leads $U_1$, $\overline{U}_1$, . . . . $U_4$ $\overline{U}_4$ are converted by means of AND circuits $AND_{1D}$, $AND_{2D}$, ....$AND_{16D}$ into decimal signals on leads $D_1$, $D_2$,....$D_{16}$. These decimal signals are sent to the logic network RK.

In phase No. 1 the digital filter is constituted by a system which must count forward when the wire A is at battery voltage (A=1), stopping when the lines of the counter reach the state 1 ($D_1$=1).

The logic functions which govern the behavior of the system are:

$$(1)\quad C_{p1}=(\overline{D}_4A+\overline{D}_1\overline{A})M_A\varphi_1$$
$$(2)\quad S_1=\overline{D}_4A\varphi_1.$$

The writing and the canceling of the bits on the auxiliary delay line $L_5$ is given by the function $$(3)\quad S_{L5}=(D_4+\overline{D}_1U_5)\varphi_1.$$

The entry of a signal bit in the next-phase register $R_{fs}$, given by the following function, generates a switchover signal in the output of that register:

$$(4)\quad S_{fs}=(U_5\overline{S}_{L5}+\overline{U}_5S_{L5})\varphi_1$$

The timing established in phase No. 2 advances at the rate of one count every two scanning impulses $M_A$, stopping at the 16th count, at which point the chronometer reverts to zero, recommencing the count each time the wire A makes a transition to ground potential. Since the chronometer counts only in the forward direction, the counting signals $C_{p2}$ invariably coincide with the second-phase counting sense signal $S_2$. The resetting to zero and the following restarting of the chronometer are decided by the second-phase reset signal $R_2$ of the counter CPB. This reset signal must take into account the bits provided by the next-phase register $R_{fs}$ in order to judge whether a transition to ground potential of the wire A is effectively a signal or a disturbance. The logic functions of the device in phase No. 2 are $$(5)\quad C_{p2}=S_2=M_B\varphi_2\overline{D}_{16}$$
$$(6)\quad R_2=R_{fs}\overline{A}M_B\varphi_2$$ where $M_B$ is equal to two signals $M_A$.

Figure 6:
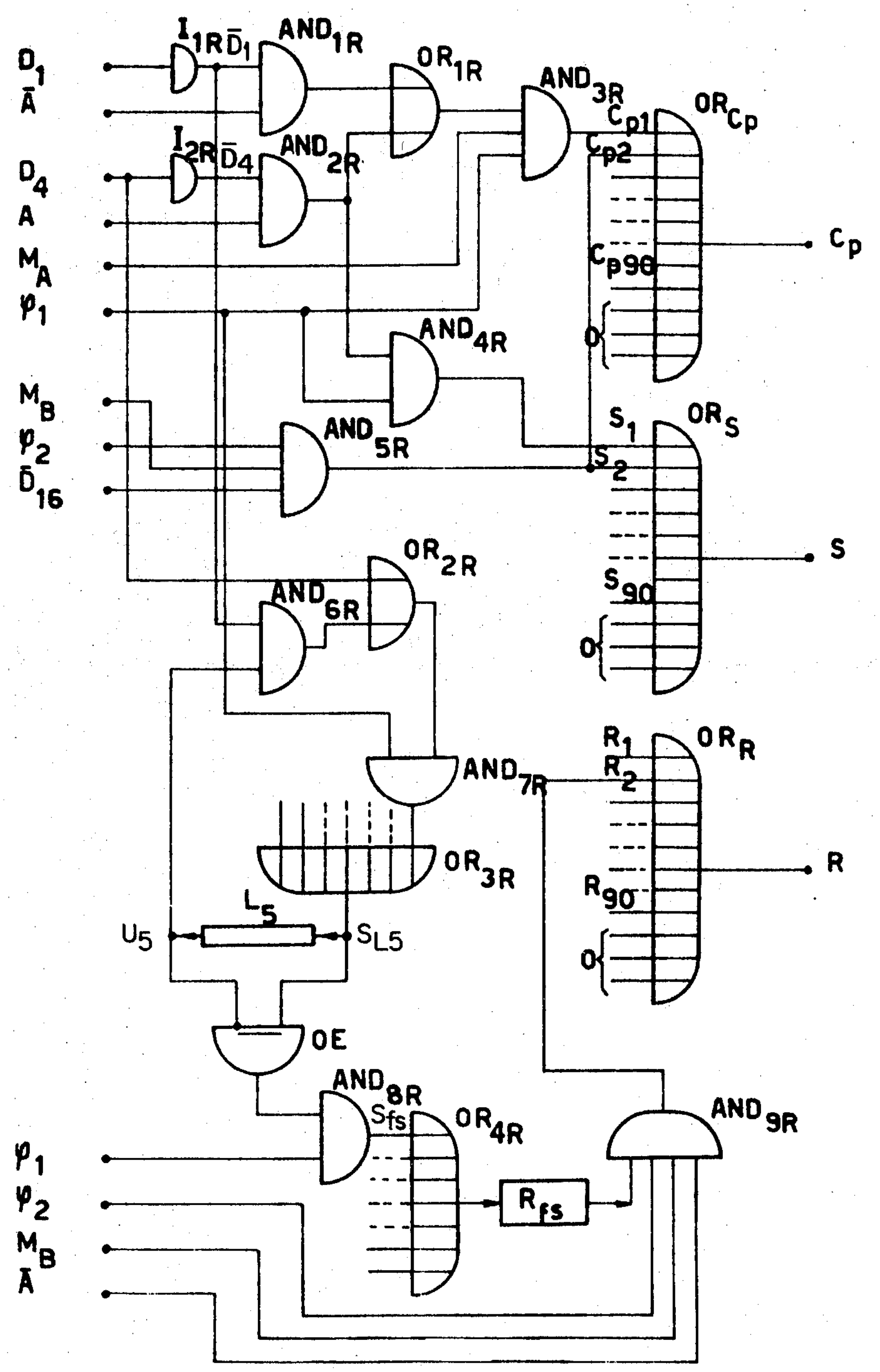
FIG. 6 represents a realization of the part of the command logic network which concerns the rejection of disturbances and the supply of the timing signal for the measurement of the length of the impulses.

The circuits that provide the functions 1, 2, 3, 4, 5, 6 are shown in FIG. 6

In order to realize the function (1), the signal $D_1$, after having passed through an inverter $I_{1R}$, and the signal $\overline{A}$ are presented to the two inputs of an AND circuit $AND_{1R}$, whereas the output of this circuit is connected to one input of an OR circuit $OR_{1R}$. The signal $D_4$, after having passed through an inverter $I_{2R}$, and the signal A are presented to the inputs of an AND circuit $AND_{2R}$ while the output of this circuit is connected to the second input of the circuit $OR_{1R}$.

The output signal of the circuit $OR_{1R}$ is fed to the first input of an AND circuit $AND_{3R}$ whereas the signals $M_A$ and $\psi_1$ are sent to the other two inputs thereof. The signal $C_{p1}$ delivered by this circuit passes to the output $C_p$ of the logic network RK through an OR circuit $OR_{Cp}$. The function 2 is provided by means of an AND circuit $AND_{4R}$ to the two inputs of which are fed the scanning signal $\varphi_1$ and the output signal of the circuit $AND_{2R}$. The output of the latter passes through an OR circuit $OR_S$ to the output S of the logic network RK.

The function 3 which deals with the writing in the auxiliary delay line $L_5$ is executed by an AND circuit $AND_{6R}$, an OR circuit $OR_{2R}$ and another AND circuit $AND_{7R}$. More precisely, the signals $\overline{D}_1$, coming from the decoding circuit of FIG. 5 and inverter $I_{1R}$, and $U_5$, which emerges from the delay line $L_5$, arrive at the circuit $AND_{R6}$, while the signals emerging from gate $AND_{6R}$ and the signals $D_4$ are sent to the circuit $OR_{2R}$. The circuit $AND_{7R}$ receives the signals emerging from gate $OR_{2R}$ and the scanning signal $\varphi_1$ and sends its output signal through another OR gate $OR_{3R}$ to the input of the line $L_5$.

The function 4 which deals with the writing in the next-phase register $R_{fs}$ is obtained by means of a circuit OE (exclusive OR) and an AND circuit $AND_{8R}$. The input and output signals of the line $L_5$ are fed to the two inputs of the circuit OE. The output of gate OE is connected to the first input of gate $AND_{8R}$ while the second input of gate $AND_{8R}$ is connected to receive the scanning signal $\varphi_1$. The output of gate $AND_{8R}$ is connected through an OR circuit $OR_{4R}$ to the input of the register $R_{fs}$. The function 5 for the counting and the sense of the count of the chronometer impulses is realized by an AND circuit $AND_{5R}$ to the inputs of which are fed the signals $M_B$, $\varphi_2$, $\overline{D}_{16}$ and whose output is connected to lead $C_p$ through gate $OR_{Cp}$ and to lead S through gate $OR_S$. The function 6 for the resetting to zero and the restarting of the chronometer is realized by an AND circuit $AND_{9R}$ to the inputs of which are delivered respectively the output signal of the register $R_{fs}$, the scanning signal $\varphi_2$, the signal $M_B$, and the signal revealing the state of the line. The output of this circuit is connected through an OR gate $OR_R$ to the output R of the network RK.

The circuits $OR_{3R}$ and $OR_{4R}$, respectively disposed at the input of the delay line $L_5$ and that of register $R_{fs}$, are centralizers which have the task of making these components available to the logic network RK these components in all the phases in which their services are required. The circuits $OR_{Cp}$, $OR_S$ and $OR_R$ have the task of connecting the particular outputs pertaining to each phase to the outputs $C_p$, S and R of the logic network RK. The last 10 inputs of the above-mentioned circuits, denoted by the symbol 0, are reserved for the clock circuit which will be described in detail hereinbelow.

In phase No. 3 the device functions as a memory of the state of the communication, the various states of phase being made to correspond to the several possible states of the communication. An example of the correspondence between states of phase and states of the communication is the following:

- $D_1$: line free.
- $D_2$: line busy, detected by the grounding of the wire C pertaining to the line used. The change from $D_1$ to $D_2$ places the next-phase register in a position to register the selected number.
- $D_3$: end of selection; revealed by the position of the next-phase register in phase No. 2.
- $D_4$: commencement of conversation revealed by the grounding of the wire A (A=O) for at least 130 msec.
- $D_1$: release, equivalent to a free line; the release is revealed by the absence of ground potential on the wire C.

The advancement of the multichannel counter in this particular phase depends on the presence of signals on the line and on the counts arising from the phase of the chronometer.

Apart from the state of the wire A of the line, that of the wire C is also of interest in order to be able to determine the busy state or the release of the line itself.

The function governing the advancement of the counter is the following:

$$(7)\quad C_{p3}=S_3=\varphi_3(\overline{U}D_1+R_{fs}\overline{A}\overline{U}D_2+R_{fs}\overline{A}D_3)$$

in which the first term between parentheses concerns the state of occupation of the line, the second term concerns the end of selection and the third term concerns the commencement of the conversation.

The cancellation of the bits in the delay lines of the counter takes place when the line arrives in the unoccupied state.

The logic function of the cancellation is:

(8) $R_3=(D_2+D_3+D_4)\ C\varphi_3$

In order to be able to signal the end of selection and, in the case of a free line, the commencement of the conversation, the chronometer must bring up to date the state of the conversation through the next-phase register. Consequently in the phase No. 2 a bit is inserted in the next-phase register when the chronometer recognizes a transition to ground potential of the wire A which continues for more than 130 msec. This task is undertaken by the function:

(9) $S_{fs}=\varphi_2 M_B D_{11}\overline{A}$ for the dispatch of the bit into the shift-phase register $R_{fs}$. In phases Nos. 4 to 10, during which the selected numbers are registered, there are detected the numerical and end-of-number signals registered in phase No. 2, the signals relating to the busy state of the line as well as the order of cancellation of the numbers registered in phase No. 3. The numerical signal obtained from phase No. 2 is present when the chronometer counts a sampling number ranging between 3 and 8, in which the effective transition of a test wire A to battery potential is ascertained.

The logic function which governs this signal is the following:

(10) $S_C=\varphi_2 M_B A R_{fs} \sum_{i=3}^{8} D_{11}$ in which the first four factors assure the existence of the effective transition to battery voltage in phase No. 2 and the terms in the sum assure that the sampling number falls in the assigned interval. The end-of-number signal is present when the chronometer registers a transition to battery voltage which lasts more than 130 msec.

In the corresponding logic function:

(11) $S_{fo}=\varphi_2 M_B A D_1$ the last two factors assure that the necessary time has expired. The registration of the selected numbers takes place in turn in the respective phases when a numerical signal together with a signal from the auxiliary delay line $L_5$ is present. The function for the advancement of the multichannel counter

(12) $C_{D4} \ldots = S_4 \ldots = R_c U_5 \sum_{i=4}^{10} \varphi_i,$ in which the scanning signals for phases Nos. 4 to 10 appear, takes into account the fact that all these phases have to be served. The signal $R_c$ is the output signal of a memory which shifts the signal $S_C$ by two or more phases. The writing in the auxiliary delay line $L_5$ takes place when a bit arrives from the next-phase register $R_{fs}$. This writing must be assured for all the phases reserved for the registration of the selected numbers. The functions for the writing in the auxiliary delay line and for the writing in the next-phase register, which takes place in phase No. 3, are respectively the following:

(13) $S_{L5}=(R_{fs}+\overline{R}_{fs}U_5) \sum_{i=4}^{10} \varphi I_i$

(14) $S_{fs}=\varphi_3 \overline{C} D_1$

The function 14 assures that the registration of the numbers begins only after the corresponding line has been made busy and serves for the registration of the first number. Inasmuch as the numbers are sequentially registered in the successive phases, it is necessary to write a bit into the next-phase register in order to pass from the registration of one number to that of the following one. The writing in this register is conditioned, after the first number, by the presence of the end-of-number signal and of the bit on the delay line $L_5$. The corresponding function is:

(15) $S_{fs}=R_{fc} U_5 \sum_{i=4}^{10} \varphi I_i$ where $R_{fc}$ is the output signal of a memory which shifts the signal $S_{fc}$ by two or more phases.

The registered numbers are canceled upon the release of the line and to this end a particular memory register $F_R$ exists in which writing takes place during phase No. 3 on the release of the line and cancellation on the return of phase 1. The functions for the writing and the cancellation are the following:

(16) $S_r=\varphi_3 D_1$

(17) $R_r=\varphi_1$

The cancellation involves all the registered numbers and consequently is applied to all the phases reserved for the registration of the numbers by means of the logic function:

(18) $R_{4 \ldots 10}=F_R \sum_{i=4}^{10} \varphi I_i$

Figure 7:
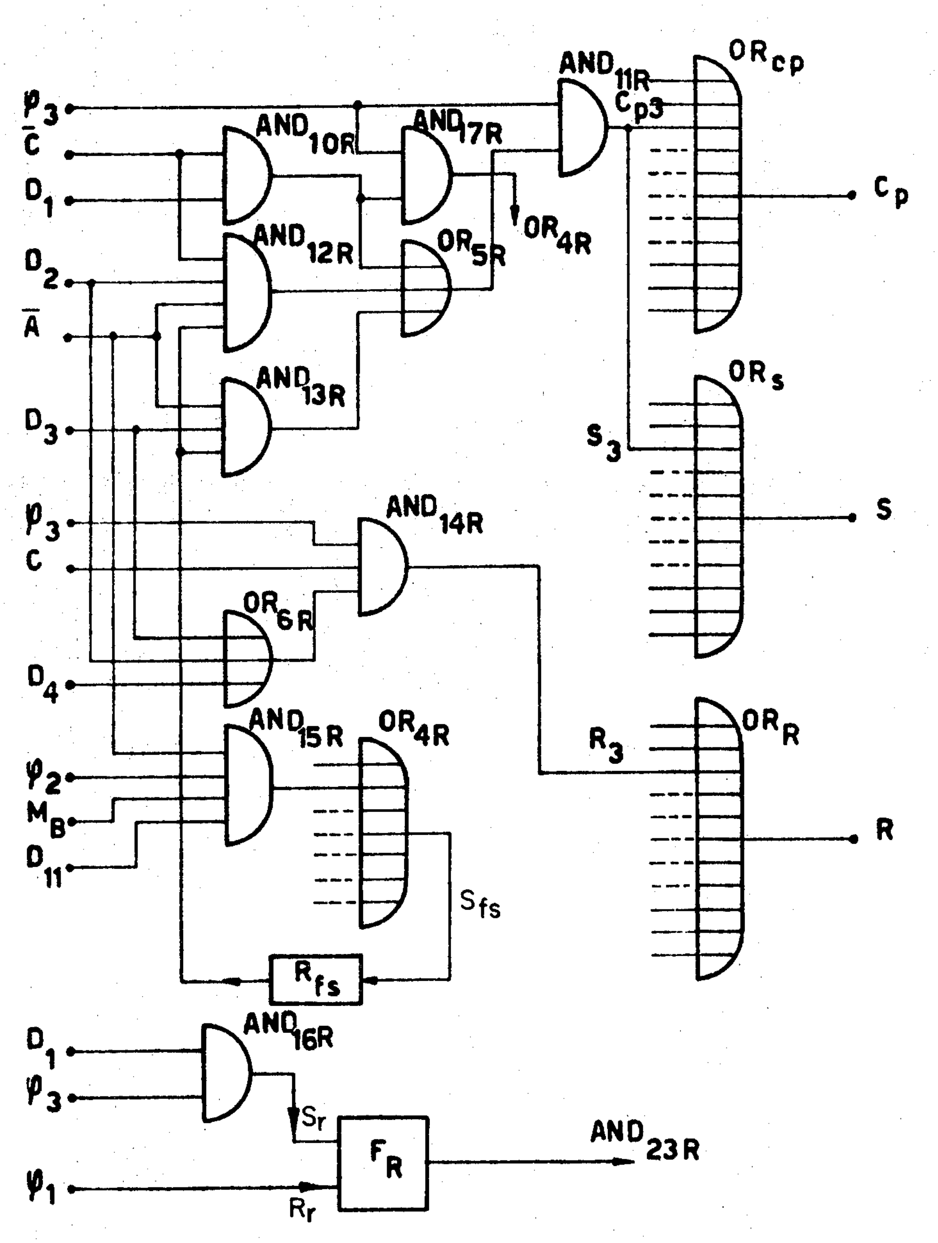
FIG. 7 represents a realization of the part of the command logic network which performs the registration of the state of the telephone call.

The circuits which realize the functions 7, 8, 9, 14 and 15 appear in FIG. 7. The function 7 is realized by an OR circuit $OR_{5R}$ to the inputs of which are supplied, in order, the output of an AND circuit $AND_{10R}$ which realizes the first term of the logic sum, the output of another AND circuit $AND_{12R}$ which realizes the second term of this sum, and the output of a further AND circuit $AND_{13R}$ which realizes the third term. To the inputs of the circuit $AND_{10R}$ are fed the decoding signal $D_1$ and the signal $\overline{C}$ revealing the transition of the wire C to ground potential. To the inputs of the circuit $AND_{12R}$ are fed the decoding signal $D_2$, the signal $\overline{C}$ revealing the transition of the wire C to ground potential, the signal $\overline{A}$ revealing the transition of the wire A to ground potential and the output of the shift register $R_{fs}$. To the inputs of the circuit $AND_{13R}$ are fed respectively the signals $\overline{A}$, $D_3$ and the output of the shift register $R_{fs}$. The output of the circuit $OR_{5R}$ is connected to the second input of an AND circuit $AND_{11R}$ to the first input of which is applied the scanning signal $\varphi_3$ and whose output is connected through OR gates $OR_{cp}$ and $OR_s$ to the outputs $C_p$ and S of the logic network RK.

The function 8 is realized by an OR circuit $OR_{6R}$ to the inputs of which are fed respectively the signals $D_2$, $D_3$ and $D_4$ and and whose output is connected to the third input of an AND circuit $AND_{14R}$.

The second input of this circuit receives the signal C, regarding the state of energization of wire C, and the third input thereof receives the scanning signal $\varphi_3$. The output $R_3$ of this circuit is connected through gate $OR_R$ to the output R of the logic network RK.

The function 9 for the writing in the next-phase register during phase No. 2 is realized by an AND circuit $AND_{15R}$ whose output is connected to the input of the register $R_{fs}$ through gate $OR_{4R}$. The inputs of this circuit receive, in order, the scanning signal $\varphi_2$, the signal $M_B$ for the stepping of the chronometer and the signal $D_{11}$. The function 14 is realized by an AND circuit $AND_{17R}$ which receives at its first input the scanning signal $\varphi_3$ and on its second input the signal emerging from the circuit $AND_{10R}$.

Figure 8:
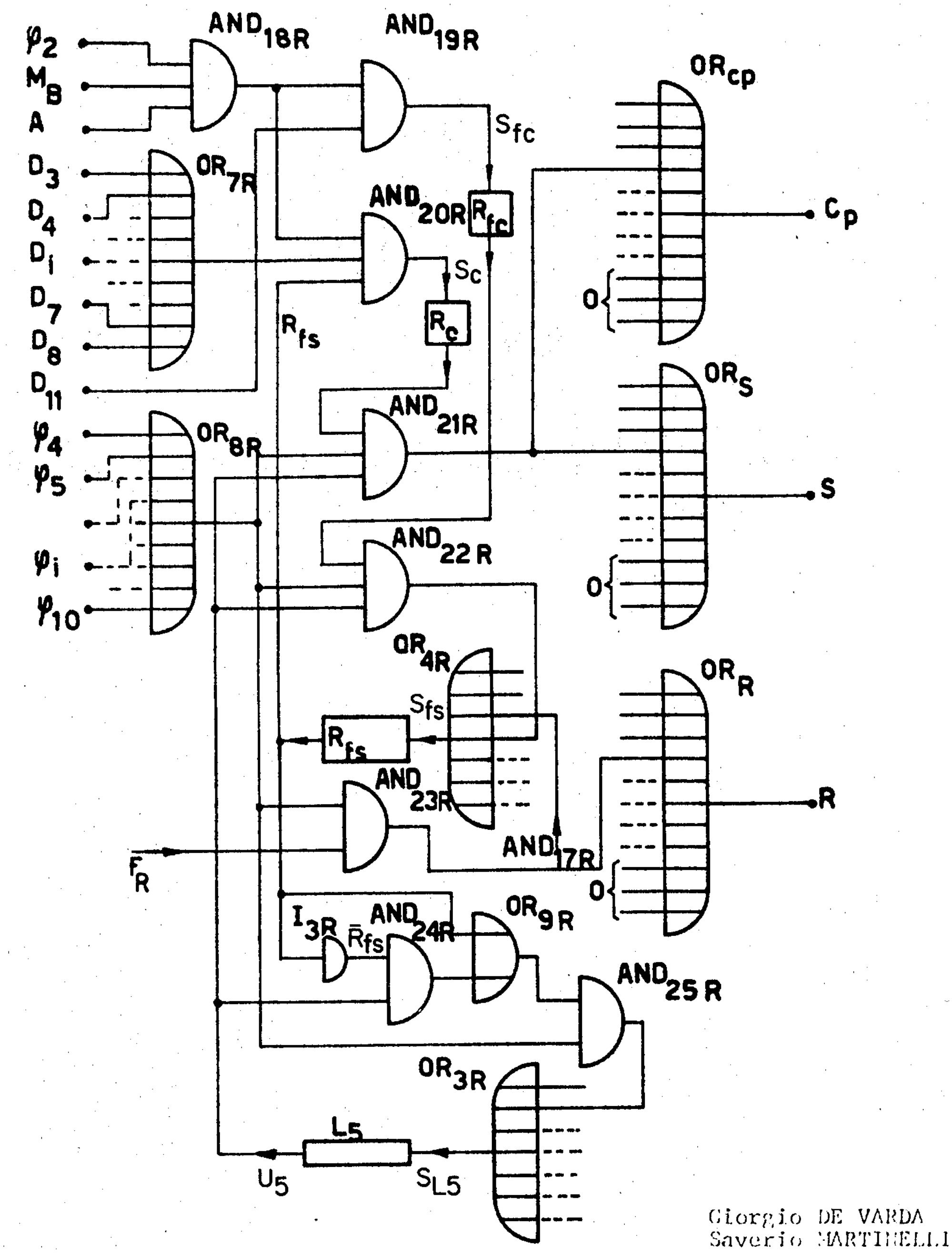
FIG. 8 shows a realization of the command logic network which serves for the registration of the selected digits.

The output of this circuit enters the register $R_{fs}$ as illustrated in FIG. 8.

The function 16 is realized by an AND circuit $AND_{16R}$ which, on receiving the scanning signal $\varphi_3$ and the decoding signal $D_1$, commands the writing in the register $F_R$.

The cancellation of the contents of the latter register is performed by the scanning signal $\varphi_1$ of the first phase. The output signal of shift register $F_R$, which serves for the cancellation of the selected numbers registered, is sent to the circuits shown in FIG. 8.

The circuits which realize the functions 10, 11, 12, 13, 15 and 18 appear in FIG. 8.

The function 10 is realized by AND circuits $AND_{20r}$, $AND_{18R}$ and OR gate $OR_{7R}$. To the inputs of the circuit $AND_{18R}$ are sent the scanning signal $\varphi_2$, the clock-stepping signal $M_R$ and the signal designating the state of the line A. The output of gate $AND_{18R}$ is connected to the first input of the circuit $AND_{20R}$. The inputs of the circuit $OR_{7R}$ receive the decoding signals $D_3$ to $D_8$ and its output is connected to the second input of the circuit $AND_{20R}$. The third input of this circuit receives the signal from the register $R_{fs}$ after a bit is presented on the input of the centralizing circuit $OR_{4R}$ which is connected to the circuit $AND_{17R}$ shown in FIG. 7.

The function 11 relating to the end-of-number signal is realized by an AND circuit $AND_{19R}$ to the first input of which is connected the output of the circuit $AND_{18R}$ and whose second input receives the decoding signal $D_{11}$.

The function for the advance of the count in the phases of registration of the selected numbers is realized by an AND circuit $AND_{21R}$ whose output is connected through the circuits $OR_{cp}$ and $OR_S$ to the outputs $C_p$ and S of the logic network. The first input of this AND circuit is connected through a memory circuit $R_C$ to the output of the circuit $AND_{20R}$ which provides the numerical signal $S_G$, its second input is connected to an OR circuit $OR_{8R}$ which receives the scanning signals from $\varphi_4$ to $\varphi_{10}$, and its third input is connected to the output of the auxiliary delay line $L_5$. The function 13, which deals with the writing in the delay line $L_5$, is realized by an AND circuit $AND_{25R}$ whose first input receives the output signal of an OR circuit $OR_{9R}$ and whose second input receives the signal of the circuit $OR_{8R}$. The first input of the circuit $OR_{9R}$ is connected to the output of register $R_{fs}$ ; the second input of this circuit is connected to the output of an AND circuit $AND_{24R}$. The first input of the circuit $AND_{24R}$ is connected through an inverting circuit $I_{3R}$ to the output of the register $R_{fs}$; its second input is connected to the output $U_5$ of the auxiliary delay line $L_5$.

The function 15 for the writing in the next-phase register, to register the number following the first one, is realized by an AND circuit $AND_{22R}$ whose first input receives the numerical signal obtained from gate $AND_{19R}$ through a memory circuit $R_{fc}$; the signal $U_5$ originating at the line $L_5$ is fed to the second input, and at the third input the group of scanning signals from gate $OR_{8R}$ arrive. The output of gate $AND_{22R}$ is connected through gate $OR_{4R}$ to the input of the register $R_{fs}$. The writing in the latter register for the registration of the first number, on the other hand, occurs by means of the signal issuing from the circuit $AND_{17R}$ shown in FIG. 7 which has already been discussed.

The function 18, relating to the cancellation of the numbers, is realized by an AND circuit $AND_{23R}$ to the first input of which is applied the signal issuing from the register of cancellation $F_R$ shown in FIG. 7 and whose second input receives the scanning signals proposed by the circuit $OR_{8R}$. The output of the circuit $AND_{23R}$ is connected through gate $OR_R$ to the output R of the logic network. The clock circuit designed to compute the time of conversation utilizes the signals of the timer which synchronizes the operation of the entire system, making use of the multichannel counter CPB, the shift register $R_{fs}$, and the decoding network shown in FIG. 5. The precision of such a clock circuit is the same as that of the quartz oscillator that pilots the timer.

The clock circuit functions in phases Nos. 91 to 100.

Since the bits of any phase are present at the output of the delay lines at regular intervals of time it is possible to take, for example, the scanning signals of phase No. 91 as a sample for the supply of the counting signal $C_p$ to the counter CPB. The counter CPB can count in phase No. 91, as in any other phase, a number of scanning signals $N_1<2^m$ (where $m$ is the number of delay lines in parallel).

When the state $N_1$ is reached, the decoding circuit for this state cancels the bits present in that phase and writes in the register $R_{fs}$ whose output produces in the following phase a counting signal $C_p$ for the counter CPB. In phase No. 92 a counting signal is detected for every $N_1$ signal of the phase No. 91. In an analogous manner, once the counter has reached the state $N_2 \leq 2^m$ in phase No. 92, the bits are canceled and writing into the register $R_{fs}$ takes place, the latter producing a counting signal for the succeeding phase. In this way the sampled timing signals are counted in sequence up to, respectively, the numerical values $N_1 . N_1 \cdot N_2 . N_1 \cdot N_2 \cdot N_3$... For example, in a practical embodiment of the invention the sampling signal has a period of 100 $\mu$sec. and thus in phase No. 91 ten-thousandths of a second are counted. The decoding circuit of state 10 in this phase cancels the corresponding bits of the delay lines and, by means of the register $R_{fs}$, produces a counting signal for phase No. 92 (thousandths of a second). The process repeats itself in an analogous manner for the succeeding phases. In phases Nos. 96 (corresponding to tens of seconds) and 98 (corresponding to tens of minutes) the decoding circuit cancels the bits once the state 6 is reached rather than the state 10.

Figure 9:
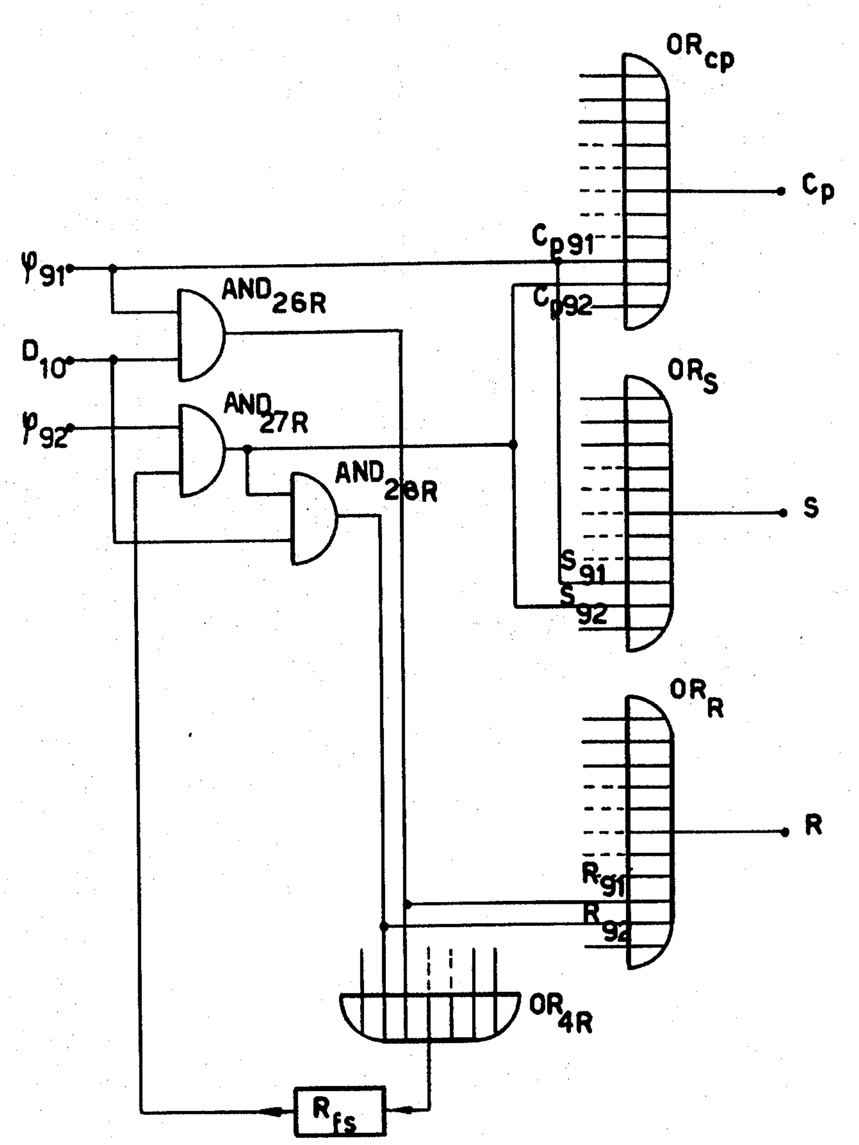
FIG. 9 represents a realization of the part of the command logic network which relates to the control of an associated clock circuit.

The part of the logic network RK which works together with the multichannel counter CPB is illustrated in FIG. 9 which is limited to phases Nos. 91 and 92 for the sake of simplicity. The signal $\varphi_{91}$ of 1-$\mu$sec. duration and a period of 100 $\mu$sec. is sent directly to the input $C_{p91}$ of gate $OR_{Cp}$ and to the input $S_{91}$ of gate $OR_S$ in such a way that the counter CPB signals an extra unit in phase No. 91 each time that an impulse of the signal $\varphi_{91}$ arrives.

The signal for the cancellation of the bits of phase No. 91 appears when the output signal $D_{10}$ of the decoding circuit and the scanning signal $\varphi_{91}$ are present. The disappearance of this signal is governed by the logic function:

$$(19)\quad R_{91}=\varphi_{91}D_{10}$$

This function is realized by an AND circuit $AND_{26R}$ whose first input receives the signal $\varphi_{91}$ and whose second input received the signal $D_{10}$.

The output of this logic circuit is connected through the circuit $OR_R$ to the output R of the network and through the circuit $OR_{4R}$ to the shift register $R_{fs}$.

The counting of the thousandths of a second takes place in phase No. 92. In order that in phase No. 92 one impulse be counted for every ten registered in phase No. 91 it is necessary that the signal for this phase be furnished by the next-phase register and by the scanning signal $\varphi_{92}$. The corresponding logic function is:

$$(20)\quad C_{p92}=S_{92}=\varphi_{92}R_{fs}$$

This function is realized by an AND circuit $AND_{27R}$ whose first input receives the signal $\varphi_{92}$ and whose second input receives the signal obtained from shift register $R_{fs}$. The output of this circuit is connected through the gate $OR_{CP}$ to the output $C_p$ and through gate $OR_S$ to the output S.

The signal of cancellation of the bits of phase No. 92 is given by the function:

$$(21)\quad R_{92}=D_{10}\varphi_{92}R_{fs}$$

This function is realized by an AND circuit $AND_{28R}$ to the first input of which is connected to the output of the circuit $AND_{27R}$ and whose second input receives the output $D_{10}$ of the decoding circuit. The output of the circuit $AND_{28R}$ is connected through the circuit $OR_R$ to the output R of the logic network and through the circuit $OR_{4R}$ to the register $R_{fs}$.

These circuits are repeated in an identical manner for the following phases apart from those for phases Nos. 96 and 98 corresponding to the tens of seconds and the tens of minutes for which it is necessary that the bits be canceled when the state 6 is reached instead of the state 10. The binary numbers given by the four bits of each phase, read in order from phase No. 100 to phase No. 91, given the tens of hours, hours, tens of minutes, minutes etc. down to the ten-thousandths of a second as shown in FIG. 2. The same circuitry consisting of the four gates $P_1$, $P_2$, $P_3$, $P_4$ (FIG. 1), which has the task of transferring the numbers selected and the telephonic criteria written in the delay lines of the network CPB to the output register RU, can also transfer to the same register the values referring to the times (hours, minutes and seconds) written in phases Nos. 100 to 95. This permits the direct transfer to the output circuit of the exact time during which a certain event has been verified in the connection examined, in addition to utilization of the system as a precise clock for the control of external mechanisms; for example, for obtaining impulses of the duration of 20 msec. for the signals of the international telegraph code for teleprinters. As has been previously set forth, both mechanism for receiving the selected numbers and the clock circuit use for completely different operations the bidirectional multichannel counter and its interconnections with the register $R_{fs}$, thus realizing a particularly simple and economic circuitry. A further advantage arises from the fact that the correct functioning of the clock is a sure index of the correct functioning of the entire apparatus, thus providing a constant check on the behavior of the complete system.

I claim:

1. In a time-sharing communication system having a plurality of incoming lines ($A_1$, $C_1$; .....$A_n$, $C_n$) each provided with a test wire ($A_1$.....$A_n$) switchable between two distinct potential levels, the combination therewith of:

timer means for establishing a succession of time slots assigned at least in part to different incoming lines, said time slots recurring in a predetermined rhythm in interleaved relationship and being each subdivided into a predetermined number of consecutive phases;

sampling means for periodically ascertaining the potential of said test wire during recurrent time slots assigned to the respective incoming line;

pulse-counting means responsive to output pulses of said sampling means indicative of the presence of a predetermined potential level on said test wire;

circulating memory means having an input connected to receive the count of said pulse-counting means and for periodically feeding back said count to said input in the rhythm of said timer means upon successive recurrence of the corresponding time slot;

timer-controlled gating means for enabling said pulse-counting means during an initial phase of each time slot to increase the circulating count by one unit in response to one of said output pulses and to reduce the circulating count by one unit in the absence of such output pulse in a range between predetermined upper and lower limits, said range including at least one intermediate value between said limits; and logic circuitry controlled by said gating means in a subsequent phase of each time slot for generating switching signals in response to attainment of either of said limits by said circulating count.

2. The combination defined in claim 1 wherein said logic circuitry includes a shift register responsive to a transition of the circulating count from one of said limits to the other of said limits during said initial phase for generating a switchover signal in said subsequent phase.

3. The combination defined in claim 2 wherein said circulating memory means includes a set of main delay lines for carrying respective bits of a binary code representing said count, and an auxiliary delay line connected to certain of said main delay lines for receiving a bit for recirculation in response to a predetermined pattern of energization representing said upper limit, said shift register being connected for energization by the output of said auxiliary delay line.

4. The combination defined in claim 3 wherein said circulating memory means further includes a binary-decimal matrix with input connections to said main delay lines and with a set of numerical output leads individually energizable by different patterns of energization of said main delay lines, said auxiliary delay line having an input connected to one of said numerical output leads, said shift register being additionally connected for energization by other of said numerical output leads.

5. The combination defined in claim 3 wherein said lower limit is 1 and said upper limit is $2^m$, m being an integer greater than 1 but less than the total number of said main delay lines.

6. The combination defined in claim 3 wherein said logic circuitry further includes a stepping circuit for periodically advancing said pulse-counting means by one unit during said subsequent phase at intervals equal to a whole number times the recurrence period of said time slots, said shift register having an output connection to said stepping circuit for resetting said pulse-counting means to zero by a switchover signal generated in response to a transition to said lower limit.

7. The combination defined in claim 6, including signaling means controlled by said gating means for transmitting call information during a further portion of each time slot in response to switchover signals from said shift register coinciding with certain counts of said pulse-counting means during said subsequent phase.

8. The combination defined in claim 7 wherein said initial phase and said subsequent phase account each for one-tenth of a time slot, said further portion lasting the remaining eight tenths of the time slot and including a line-switching phase and seven dialing phases.

9. The combination defined in claim 2, further comprising a clock circuit controlled by said gating means during a time slot unassigned to any incoming line for transmitting to said pulse-counting means a continuous train of clock pulses, circuit means including said shift register for allocating different denominational orders to the count of said pulse-counting means stored by said circulating memory means during different phases of said unassigned time slot, and registration means for said denominational orders connected to the output of said circulating memory means.

10. The combination defined in claim 9 wherein said unassigned time slot is divided into ten phases corresponding to ten denominational orders, the lowest denominational order having a unit value equal to the recurrence period of said unassigned time slot.

11. In a time-sharing communication system having a plurality of incoming lines ($A_1$, $C_1$;.......$A_n$, $C_n$) each provided with a test wire ($A_1$..........$A_n$) switchable between two distinct potential levels, the combination therewith of:

timer means for establishing a succession of time slots assigned in part to different incoming lines, said time slots recurring in a predetermined rhythm in interleaved relationship and being each subdivided into a predetermined number of consecutive phases;

sampling means for periodically ascertaining the potential of said test wire during recurrent time slots assigned to the respective incoming line;

pulse-counting means responsive to output pulses of said sampling means indicative of the presence of a predetermined potential level on said test wire;

circulating memory means having an input connected to receive the count of said pulse-counting means and for periodically feeding back said count to said input in the rhythm of said timer means upon successive recurrence of the corresponding time slot;

timer-controlled gating means for enabling said pulse-counting means during an initial phase of each time slot to modify the circulating count by one unit in response to one of said output pulses;

a shift register responsive to a modification of the circulating count during said initial phase for generating a switchover signal in subsequent phase;

a clock circuit controlled by said gating means during a time slot unassigned to any incoming line for transmitting to said pulse counting means a continuous train of clock pulses;

circuit means including said shift register for allocating different denominational Orders to the count of said pulse-counting means stored by said circulating memory means during different phases of said unassigned time slot; and registration means for said denominational orders connected to the output of said circulating memory means.